United States Patent
Duncan et al.

[11] Patent Number: 5,123,764
[45] Date of Patent: Jun. 23, 1992

[54] UTILITY CLEANING TOOL FOR WINDSHIELD WIPER BLADES

[76] Inventors: Marvin G. Duncan; Don Duncan, both of 22718 S.W. Johnson Rd., West Linn, Oreg. 97068

[21] Appl. No.: 726,647

[22] Filed: Jul. 2, 1991

Related U.S. Application Data

[63] Continuation of Ser. No. 527,328, May 23, 1990, abandoned.

[51] Int. Cl.⁵ .............................................. A47L 1/08
[52] U.S. Cl. ....................................... 401/10; 401/11; 401/186; 401/196; 401/202; 401/207
[58] Field of Search ............... 401/9, 10, 11, 183, 401/186, 196, 202, 207; 15/250 R, 250.36

[56] References Cited

U.S. PATENT DOCUMENTS

| | | | |
|---|---|---|---|
| 599,372 | 2/1898 | Tallmadge | 401/196 |
| 801,087 | 10/1905 | Kahn | 401/202 |
| 1,766,529 | 6/1930 | Peirson | |
| 1,978,716 | 10/1934 | Morehouse | 401/10 |
| 2,820,234 | 1/1958 | Rigney | 401/186 |
| 2,864,109 | 12/1958 | Martin, Jr. | 401/196 |
| 3,455,638 | 7/1969 | Braswell | 401/183 X |
| 3,670,459 | 6/1972 | Welton | 15/250.36 X |
| 3,708,924 | 1/1973 | Prunchak | 15/250.36 X |
| 3,811,783 | 5/1974 | Johnson | 401/10 X |
| 4,069,894 | 1/1978 | Black | 401/11 X |
| 4,953,999 | 9/1990 | Rivers | 401/11 X |

*Primary Examiner*—Steven A. Bratlie
*Attorney, Agent, or Firm*—Eugene M. Eckelman

[57] ABSTRACT

A flexible bottle which serves as a fluid cleaning reservoir includes a cap that has a crosshead supporting a cleaning fluid absorbing material. A flow passageway is provided in the cap and feeds cleaning fluid to the absorbing material when the bottle is squeezed and the cap is distorted to open the flow passageway. The absorbent material has a longitudinal slit in its end surface through which a windshield wiper blade can be moved for cleaning the blade. A cover is mounted on the crosshead when the tool is stored. The device can also be used to clean the windshield.

1 Claim, 1 Drawing Sheet

UTILITY CLEANING TOOL FOR WINDSHIELD WIPER BLADES

This application is a continuation of application Ser. No. 07/527,328, filed May 23, 1990 now abandoned.

This invention relates to a new and novel utility cleaning tool for cleaning windshield wiper blades and also the surface of windshields.

Automotive windshields frequently collect road grime and grease that smear as the wipers move across the glass. This seriously restricts vision through the windshield and in inclement weather the windshield must be periodically cleaned. Cleaning off this grime and grease from the windsheild does not totally solve the problem since the grime and grease stick to the windshield wiper blades and an undesirable coating is again applied to the glass by the wiper blades. The windshield wiper blades must thus be individually cleaned. The average motorist does not have the facilities, at least conveniently, to clean the wiper blades.

SUMMARY OF THE INVENTION

According to the present invention and forming a primary objective thereof, a utility cleaning tool is provided that can be conveniently carried in the automobile or other vehicle and has means for conveniently and efficiently cleaning the windshield wiper blades.

Another object is to provide a cleaning tool of the type described which by its structure can also be used to wipe the windshield.

In carrying out these objectives, the utility cleaning tool of the invention comprises a fluid cleaning reservoir with a cap thereon. The cap supports a cross head which supports a fluid cleaning absorbing material thereon. Flow passageway means are provided in the cap feeding cleaning fluid from the reservoir to the cross head. The fluid cleaning absorbing material has a full length longitudinal slit in its outer end surface dimensioned and arranged to receive the wiping edge of a windshield wiper blade and also arranged to provide a cleaning function of the blade when it is moved through the slit. The cross head is angled relative to the reservoir for ease of use in cleaning the wiper blades without removing the latter from their holder. A removable cover is utilized to enclose the fluid cleaning absorbing material when the tool is stored. The device may also be used to clean the surface of the windshield.

The invention will be better understood and additional objects and advantages will become apparent from the description taken in connection with the accompanying drawings.

DETAILED DESCRIPTION OF A PREFERRED EMBODIMENT

Figure 1:
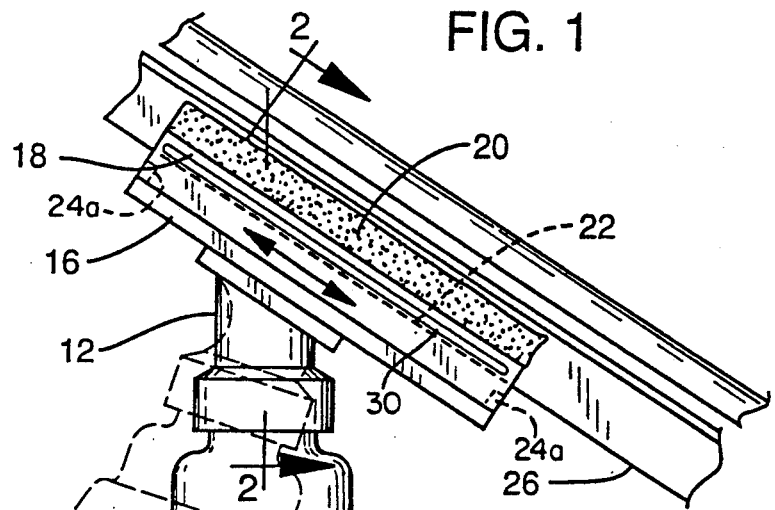
FIG. 1 is an elevational view of the present utility cleaning tool, this tool being shown in combination with a fragmentary portion of a windshield wiper blade.
Figure 2:
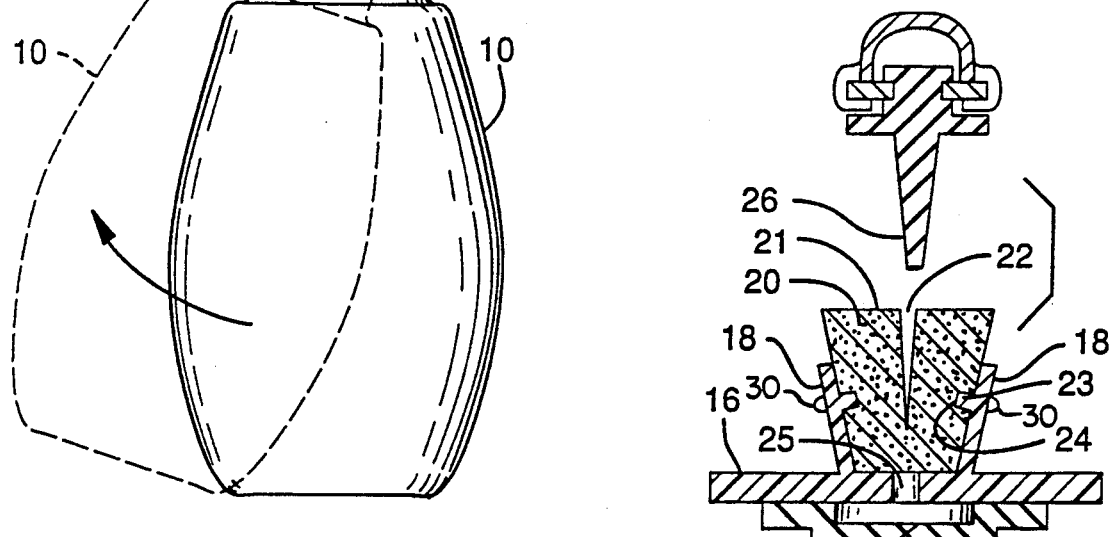
FIG. 2 is a vertical sectional view taken on the line 2—2 of FIG. 1.
Figure 3:
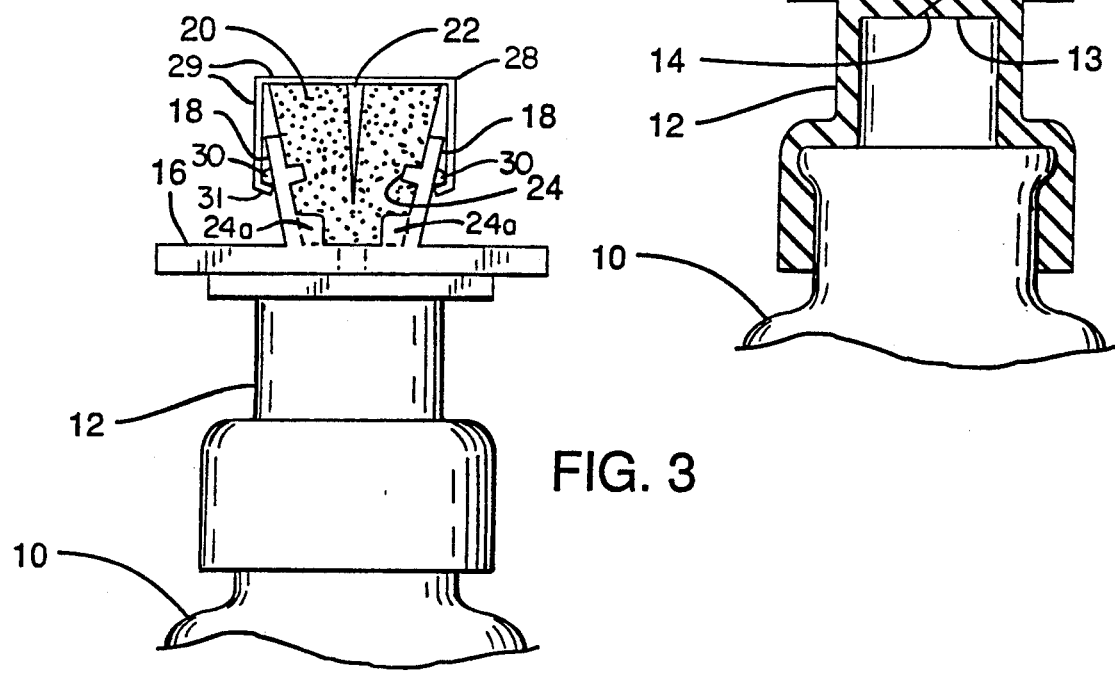
FIG. 3 is a view similar to FIG. 2 but showing a removable cover on the tool.

With particular reference to the drawings, which show the invention in detail, the numeral 10 designates a reservoir for cleaning fluid. This reservoir is preferably a squeeze bottle of conventional construction which also employs a rubberized cap 12 also of conventional construction wherein the top wall 13 of the cap is angled and includes a short cut 14 centrally therein. According to conventional practice, the cut is normally closed but will open to allow the outward flow of fluid when the bottle 10 is squeezed simultaneously with distorting the cap in a direction wherein it approaches a right angle position relative to the longitudinal direction of the bottle.

According the the invention, a base plate or cross head 16 is integrally secured to the top wall 13 of the cap 12. This base plate supports a pair of diverging flanges 18 which support a cleaning fluid absorbing filler 20 therebetween. Filler 20 has a top flat surface 21 with a longitudinal slit or cut recess 22 extending a fraction of an inch, such as one-half inch, into the body of the filler.

The filler 20 is confined between the flanges 18 and such flanges and filler have cooperating longitudinal ribs 23 and matching recesses 24. The filler can fit frictionally in place but preferably is also adhesively secured to the recess formed by the flanges. Also, in addition to or in lieu of the adhesive, small inwardly directed projections 24a are provided at the ends of the flanges 18 adjacent the base plate 16.

The base plate 16 has an aperture 25 aligned with the cut 14 in the top of the cap whereby when fluid is forced through the cut 14, such cut and aperture form direct passageway means into the filler which is aligned with slit 22. Filler 20 may comprise a conventional sponge material.

For the purpose of cleaning a wiper blade 26, the filler 20 is first charged with cleaning fluid by bending the top portion 16 of the cap as noted above and squeezing the bottle. This can be done before mounting the device on a wiper baldè or after it has been mounted on the blade. The cleaning fluid enters the bottom of the slit 22 and disperses through the length thereof whereby upon one or more passes of the blade through the slit, the road grime and grease will be removed. The angle of the cap 12 and the filler 20 on the bottle provides a convenient angle of engagement with wiper blades. When the cap is not distorted, the cut 14 in the top of the cap 12 will be automatically closed and the device can be stored conveniently in the vehicle.

It can be understood that the flat end surface 21 can be used for cleaning the windshield surface, and for this purpose the depth dimension of the sponge is such that it projects beyond flanges 18.

It is preferred that a removable cover 28 be provided for enclosing the filler 20 when the tool is stored. This cover has enclosing walls 29 at the top, side and ends but is open at the bottom. The outer surface of flanges 18 have one or more beads 30 frictionally engageable by hook ends 31 on the bottom edges of the side walls of the cover. The cover is sufficiently flexible for snap on and off engagement with the beads.

In is to be understood that the form of the our invention herein shown and described is to be taken as a preferred example of the same and that various changes in the shape, size and arrangement of parts may be resorted to without departing from the spirit of our invention, or the scope of the subjoined claims.

Having thus described our invention, we claim;

1. A utility cleaning tool for cleaning windshields and windshield wiper blades of the type having a longitudinal body portion arranged to hold the blade on a wiper arm and having a windshield engaging flexible wiper portion with tapered side wall surfaces extending from the body portion to a wiping edge, said utility cleaning tool comprising:
- a flexible squeeze-type container having an upper open end and forming a fluid reservoir for a cleaning fluid,
- a flexible cap on the upper open end of said reservoir,
- a cross head on said cap having an upper surface and opposite ends,
- said cross head being angularly inclined from one end of the other relative to said container,
- an upper projecting portion on the upper surface of said cross head comprising a pair of longitudinal flanges with inner and outer surfaces and defining an upwardly widened tapered slot between said flanges,
- a cleaning fluid absorbing material mounted on said cross head between said flanges and extending upwardly beyond said flanges to form an upper projecting portion with a flat end surface,
- longitudinal cooperating ribs and recesses on said flanges and said cleaning fluid absorbing material holding said cleaning fluid material in said slot,
- flow passageway means in said flexible cap comprising an angled cut in said cap arranged to be opened to feed cleaning fluid from said container to said cleaning fluid absorbing material by inverting said container and at the same time distorting said cap at said cut to open the latter,
- and a full length longitudinal slit in said cleaning fluid absorbing material,
- said longitudinal slit leading inwardly into said cleaning fluid absoring material from said upper end surface and being tapered and dimensioned to engage the tapered windshield wiper blade to provide a cleaning function when the blade is pulled longitudinally through the slit,
- said flat end surface comprising a wiping surface capable of rubbing against and cleaning a windsheld surface.

* * * * *